(12) United States Patent
Mochizuki

(10) Patent No.: US 11,244,417 B2
(45) Date of Patent: Feb. 8, 2022

(54) DIGITAL IMAGING APPARATUS AND DIGITAL IMAGING METHOD

(71) Applicant: TOSHIBA TEC KABUSHIKI KAISHA, Tokyo (JP)

(72) Inventor: Yuji Mochizuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/912,511

(22) Filed: Jun. 25, 2020

(65) Prior Publication Data

US 2021/0073936 A1 Mar. 11, 2021

(30) Foreign Application Priority Data

Sep. 6, 2019 (JP) .............................. JP2019-162737

(51) Int. Cl.
| | |
|---|---|
| G06T 1/00 | (2006.01) |
| H04N 13/254 | (2018.01) |
| H04N 13/239 | (2018.01) |
| H04N 5/232 | (2006.01) |
| H04N 13/00 | (2018.01) |

(52) U.S. Cl.
CPC ....... *G06T 1/0021* (2013.01); *H04N 5/23229* (2013.01); *H04N 13/239* (2018.05); *H04N 13/254* (2018.05); *H04N 2013/0081* (2013.01)

(58) Field of Classification Search
CPC ....... G06T 1/0021; G06T 7/90; H04N 13/239; H04N 5/23229; H04N 13/254; H04N 2013/0081; H04N 5/332; H04N 5/2256; G06F 2221/0733; G06F 21/16; G06F 21/32; G06F 21/602; G06F 21/645; G06Q 30/018; G06Q 30/06; G06Q 30/08; G06Q 50/00; G06Q 50/10; G06Q 50/26; G16B 50/40;

(Continued)

(56) References Cited

U.S. PATENT DOCUMENTS

| | | | |
|---|---|---|---|
| 2009/0190189 A1* | 7/2009 | Suga | H04N 1/00127 358/474 |
| 2011/0034176 A1* | 2/2011 | Lord | G06K 9/6253 455/450 |

(Continued)

FOREIGN PATENT DOCUMENTS

| | | | |
|---|---|---|---|
| CN | 107563338 A | * | 1/2018 |
| CN | 107563338 A | | 1/2018 |
| JP | 2008-204246 A | | 9/2008 |

OTHER PUBLICATIONS

Chinese Office Action dated Sep. 22, 2021 in related Chinese Patent Application No. 202010692132.0 with English Translation, 15 pages.

*Primary Examiner* — Dramos Kalapodas
(74) *Attorney, Agent, or Firm* — Kim & Stewart LLP

(57) ABSTRACT

According to an embodiment, a digital imaging apparatus includes: a camera module and a controller. The controller detects, on a basis of data of a captured image captured by the camera module, whether or not there is a distance difference between an object and a background included in the captured image. The controller adds, where it has been detected that there is the distance difference, authentication information to the data of the captured image, and stores, in a memory, the captured image to which the authentication information has been added.

10 Claims, 3 Drawing Sheets

(58) Field of Classification Search
CPC ............... G06K 9/2018; G06K 9/2027; G06K 9/00355; G06K 9/00
See application file for complete search history.

(56) References Cited

U.S. PATENT DOCUMENTS

| | | | |
|---|---|---|---|
| 2014/0375821 A1* | 12/2014 | Wu | H04N 5/2256 348/164 |
| 2018/0050800 A1* | 2/2018 | Boykin | H04B 7/18506 |
| 2018/0091718 A1* | 3/2018 | Kusumi | G06T 7/586 |
| 2019/0229159 A1* | 7/2019 | Wu | G09G 3/2003 |
| 2019/0287272 A1* | 9/2019 | Wu | H04N 5/2354 |
| 2020/0026831 A1* | 1/2020 | Alameh | G06K 9/00288 |
| 2020/0130678 A1* | 4/2020 | Gotoda | G08G 1/166 |
| 2020/0387591 A1* | 12/2020 | Witchey | G06F 21/32 |

\* cited by examiner

DIGITAL IMAGING APPARATUS AND
DIGITAL IMAGING METHOD

CROSS-REFERENCE TO RELATED
APPLICATIONS

This application is based upon and claims the benefit of priority from the prior Japanese Patent Application No. 2019-162737, filed on Sep. 6, 2019, the entire contents of which are incorporated herein by reference.

FIELD

An embodiment to be described here generally relates to a digital imaging apparatus, and a digital imaging method.

BACKGROUND

In recent years, there has been an Internet service in which a self-owned article is imaged with a camera, a smartphone, or the like, and various transactions are performed using the captured image. For example, there are services that mediate auctions, transactions between individuals, or the like, and services called digital pawn shops. In these services, customers determine the asset value of each article on the basis of the captured image of the corresponding article. A transaction between the person who took the image and the customer is made on the basis of the asset value. In such a transaction, it is implicitly understood that the article shown in the captured image is the property of the person who took the image.

However, even if the person who took the image does not own the imaged article itself, he/she can receive the above-mentioned service as long as he/she has a captured image in which the article is shown. For example, the person who took the image can receive the above-mentioned service even if he/she has reimaged, with a digital camera or the like, the photograph captured by another person. For this reason, after the service starts, there is a possibility that troubles will occur between the person who took the image and the customer or the service provider.

DETAILED DESCRIPTION

According to an embodiment, a digital imaging apparatus includes: a camera module; a memory; and a controller. The camera module captures an image including an object and a background, and outputs data of a captured image. The memory stores the output data of the captured image. The controller detects, on a basis of the output data of the captured image, whether or not there is a distance difference between the object and the background included in the captured image. The controller adds, where it has been detected that there is the distance difference, authentication information to the output data of the captured image, and stores, in the memory, the captured image to which the authentication information has been added. The controller terminates, where it has been detected that there is no distance difference, the processing without adding the authentication information.

Hereinafter, a digital imaging apparatus and a digital imaging method according to an embodiment will be described with reference to the drawings. In each drawing, the same reference symbols indicate the same or similar components.

Figure 1:
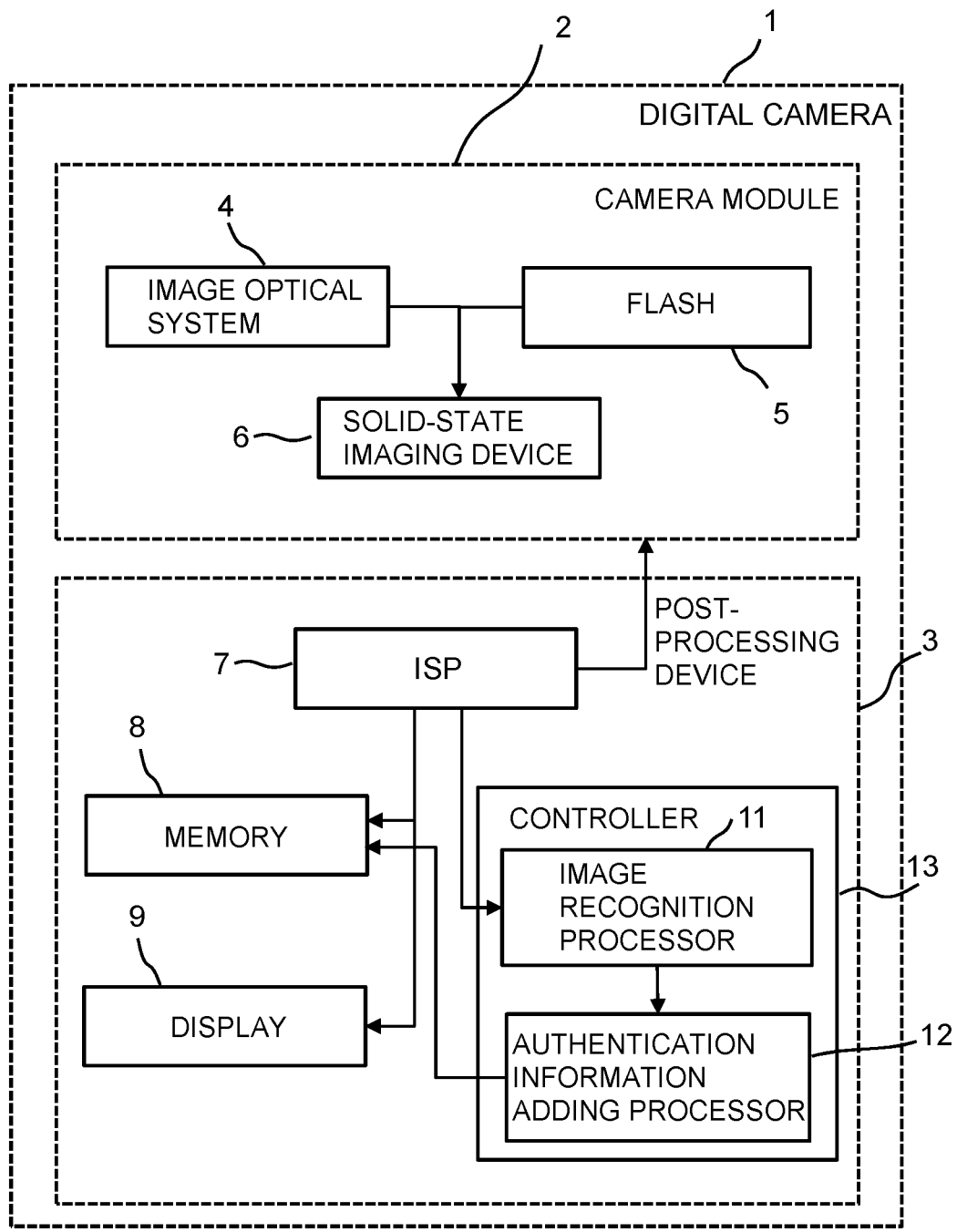
FIG. 1 is a block diagram showing a digital camera according to an embodiment.
Figure 2:
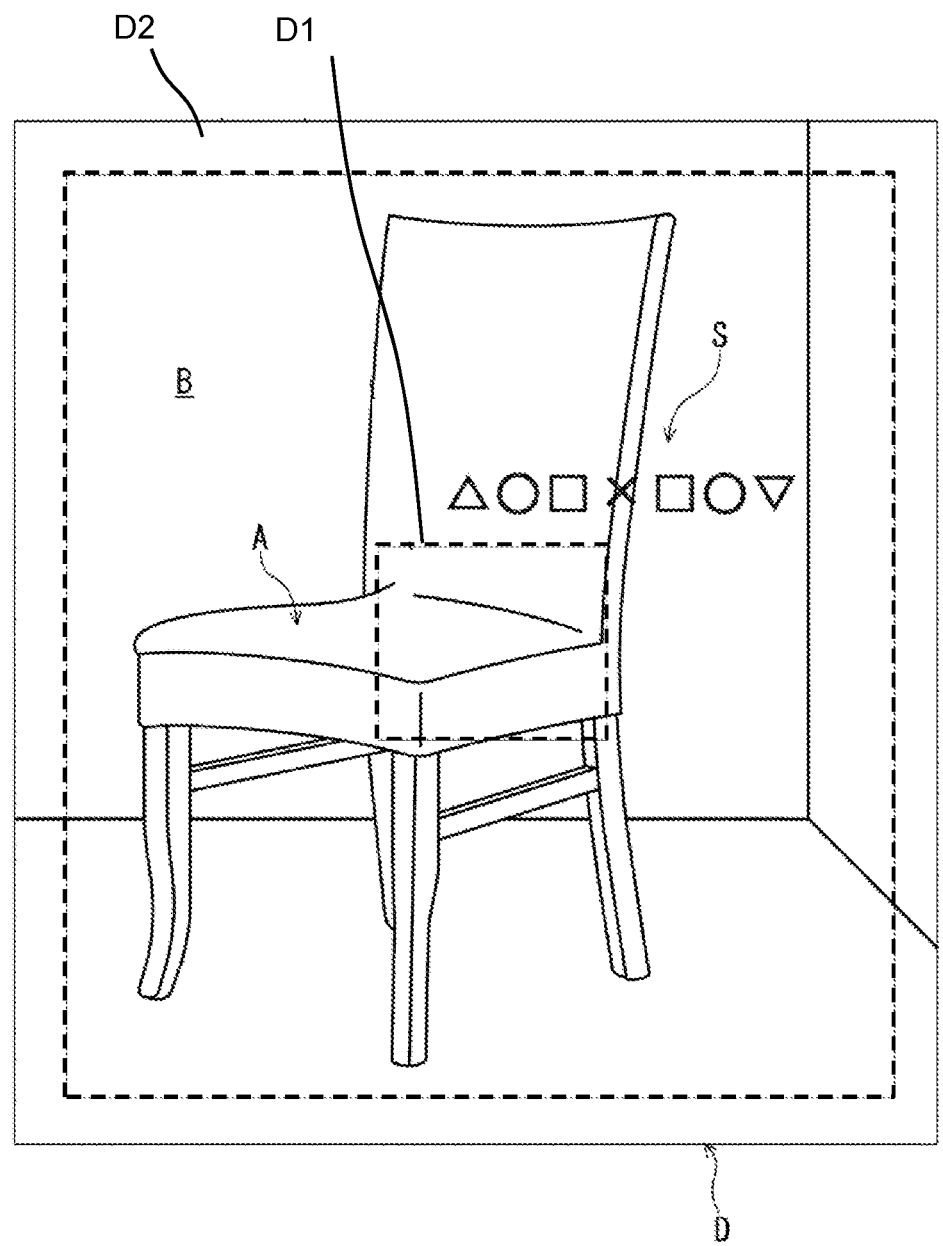
FIG. 2 is a diagram showing a captured image of the digital camera according to the embodiment.

FIG. 1 shows a schematic configuration of a digital camera that is a digital imaging apparatus according to an embodiment. FIG. 2 schematically shows a captured image D.

As shown in FIG. 1, a digital camera (digital imaging apparatus) 1 includes a camera module 2 and a post-processing device 3. The camera module (imaging unit) 2 includes an imaging optical system 4, a flash (illumination unit) 5, and a solid-state imaging device 6.

As shown in FIG. 1, the post-processing device 3 includes an image signal processor (ISP) 7, a memory 8, and a display 9. The digital camera 1 according to the embodiment may be one of various electronic apparatuses including a portable information terminal such as a smartphone.

The imaging optical system 4 of the digital camera 1 takes in light from an object A, and forms an image of an object on the image sensor of the solid-state imaging device 6. The flash (illumination unit) 5 emits flash light toward the object A and a background B of the object A during imaging. The solid-state imaging device 6 captures an image of the object.

The solid-state imaging device 6 includes an image sensor that is an imaging element, and a signal processing circuit that is an imaging processing device. The image sensor is, for example, a complementary metal oxide semiconductor (CMOS) image sensor. The image sensor may be a charge coupled device (CCD) image sensor, in addition to the CMOS image sensor.

The image sensor includes a pixel array, a vertical shift register, a timing control unit, a correlated double sampling (CDS) unit, an analog-to-digital converter (ADC), and a line memory.

The pixel array is disposed in an imaging area of the image sensor. The pixel array includes a plurality of pixels arranged in an array in the horizontal direction (row direction) and the vertical direction (column direction). Each of the pixels includes a photodiode that is a photoelectric conversion device. The photodiode generates a signal charge corresponding to the amount of incident light. The pixel array detects, for each pixel, the signal level of light of respective colors in accordance with the color arrangement.

The timing control unit supplies the vertical shift register with a vertical synchronization signal for instructing a timing for reading the signal from each of the pixels of the pixel array. The timing control unit supplies the CDS, the ADC, and the line memory with timing signals for instructing a drive timing.

The vertical shift register selects pixels in the pixel array for each row in accordance with the vertical synchronization signal from the timing control unit. The vertical shift register outputs a read signal to each of the pixels in the selected row. The pixel to which the read signal has been input from the vertical shift register outputs accumulated signal charges accumulated corresponding to the amount of incident light. The pixel array outputs the signal from each pixel to the CDS via a vertical signal line.

The CDS of the image sensor performs, on the signal from the pixel array, a correlated double sampling processing for reducing the fixed pattern noise. The ADC converts an analog signal into a digital signal. The line memory accumulates the signal from the ADC. The image sensor outputs the accumulated signals to the line memory.

The signal processing circuit of the solid-state imaging device 6 performs various types of signal processing on the image signal from the image sensor. The solid-state imaging device 6 outputs, to the outside of the chip, the image signal on which the signal processing has been performed by the signal processing circuit. The solid-state imaging device 6 performs feedback control of the image sensor on the basis of the data on which the signal processing has been performed by the signal processing circuit.

The ISP 7 performs signal processing on the image signal obtained by imaging with the solid-state imaging device 6. The ISP 7 performs signal processing such as scratch correction, noise reduction processing, lens shading correction, white balance adjustment, color matrix processing, and gamma correction.

The memory 8 stores image data on which the signal processing has been performed by the ISP 7. Note that in the following description, the image data will be referred to simply as the "image" in some cases. Further, the memory 8 outputs the image signal to the display 9 in accordance with a user operation or the like.

Note that the memory 8 stores a program for causing a controller 13 (computer), which will be described below, of the digital camera 1 as an image recognition unit (image recognition processor 11 described below) and an authentication information adding unit (authentication information adding processor 12 described below). The digital camera 1 functions as an image recognition unit to detect a distance difference between the object A and the background B from the captured image D captured by the camera module 2. The digital camera 1 functions as an authentication information adding unit to add, in the case where it has been detected that there is the distance difference, authentication information to the captured image D.

The display 9 displays an image in accordance with the image signal input from the ISP 7 or the memory 8. The display is, for example, a liquid crystal display. The digital camera 1 performs feedback control of the camera module 2 on the basis of the data on which the signal processing has been performed by the ISP 7.

Further, the digital camera 1 includes the controller 13. The controller 13 includes the image recognition processor 11 and the authentication information adding processor 12. The image recognition processor 11 and the authentication information adding processor 12 of the controller 13 execute the above-mentioned program stored in the memory 8 to respectively function as the image recognition unit and the authentication information adding unit. That is, the image recognition processor 11 performs image recognition using the image output from the ISP 7. For example, the image recognition processor 11 extracts a particular part from an image and recognizes an object. Further, the image recognition processor 11 separates an object and a background from each other, and extracts the contour, on the basis of the brightness of the image. More specifically, the image recognition processor 11 recognizes a distance difference between the object A and the background B shown in the image. In particular, the image recognition processor 11 detects (recognizes) a distance difference between the object A and the background B on the basis of the difference in brightness or saturation between them by using the image obtained by firing the flash 5 and imaging the object A and the background B. Note that as the method of detecting the distance difference between the object A and the background B, a well-known method can be used.

The authentication information adding processor 12 adds authentication information to an image after the image recognition by the image recognition processor 11. Specifically, the authentication information adding processor 12 adds, as authentication information, electronic (digital) signature or electronic (digital) watermark S to the image output from the ISP 7. The authentication information adding processor 12 adds, for example, $\Delta\bigcirc\square\times\square\bigcirc\nabla$ as the electronic watermark S to the captured image by the camera module 2 as shown in FIG. 2. Note that as the method of adding the electronic signature or the electronic watermark S to a captured image, a well-known method can be used.

Figure 3:
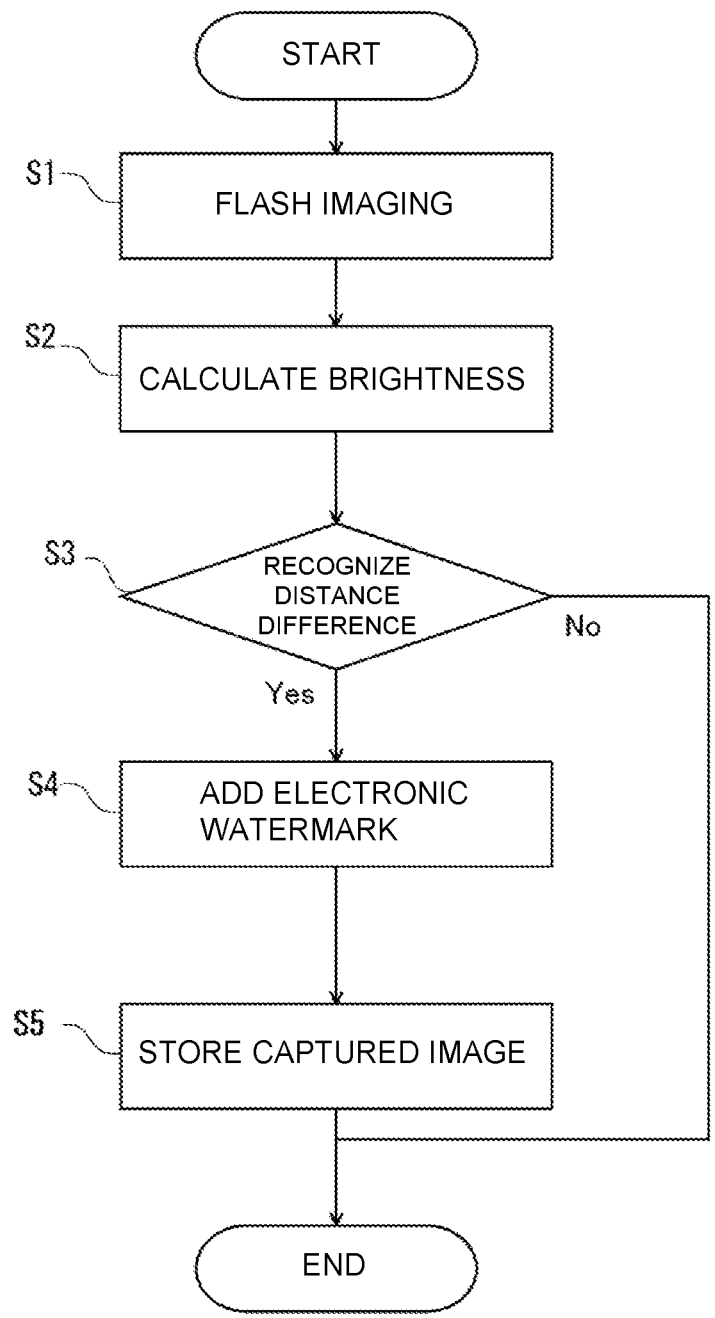
FIG. 3 is a flowchart showing processing performed by the digital camera according to the embodiment.

FIG. 3 shows processing performed by the controller 13 of the digital camera 1 according to the embodiment. In the processing shown in FIG. 3, the controller 13 causes the flash 5 to emit light when the camera module 2 images (photographs) the object A in Step S1 first. The light from the flash 5 is reflected by the object A and the background B to enter the imaging optical system 4. The imaging optical system 4 includes, for example, a main mirror, a sub mirror, and a mechanical shutter. The light that has entered the imaging optical system 4 travels to the image sensor of the solid-state imaging device 6 through the main mirror, the sub mirror, and the mechanical shutter. The digital camera 1 images the object A and the background B using the image sensor of the solid-state imaging device 6.

The light reflected by the sub mirror of the imaging optical system 4 travels to, for example, an autofocus sensor. The digital camera 1 performs focus adjustment using the detection result by the autofocus sensor. The light reflected by the main mirror travels to a finder through a lens and a prism.

The image (images of the object A and the background B) captured by the image sensor of the solid-state imaging device 6 is sent to the ISP 7. Then, the ISP 7 performs signal processing of the image signal. For example, the ISP 7 performs signal processing such as scratch correction, noise reduction processing, lens shading correction, white balance adjustment, color matrix processing, and gamma correction.

The captured image D (see FIG. 2) output from the ISP 7 is analyzed by the image recognition processor 11 of the controller 13. The image recognition processor 11 separates and recognizes the object A and the background B from the captured image D shown in FIG. 2, and subsequently recognizes a distance difference between the object A and the background B shown in the captured image D. Note that in general, the separation recognition (isolation) of the object A and the background B can be executed by using an image recognition technology. In the following description of the embodiment, the features of the captured image D will be focused. That is, in the following embodiment, assumption is made that the captured image D is provided to a digital pawn shop or the like. Since the captured image D is to cause a customer to correctly recognize the value of the object A, the captured image D is captured so that the object A is disposed at the center of the captured image D. For this reason, by setting the area including the center of the captured image D as a center part D1, the center part D1 surely includes the object A. Meanwhile, it is unlikely that a peripheral part (peripheral part D2) of the captured image D includes the object A.

In this regard, the center part D1 including the center of the captured image D and the peripheral part D2 of the captured image D have been respectively set as an area in which there is the object A and as an area in which there is no object A in advance. As shown in FIG. 2, the center part D1 of the captured image D is a central area of the captured image D in the vertical and horizontal directions. The center part D1 is a quadrangle (or a circle), and the vertical and horizontal lengths (or diameters) of the center part D1 are, for example, 10 to 20% of the respective entire lengths. The range of the center part D1 can be appropriately set. The peripheral part D2 of the captured image D is an area at both ends of the captured image D in the vertical and horizontal directions. The peripheral part D2 has a rectangular fame shape, and the vertical and horizontal lengths (widths) of the peripheral part D2 are, for example, 5 to 10% of the respective entire lengths. The range of the peripheral part D2 is appropriately set. As a result, the image of the center part including the object A is the center part D1, and the image of the peripheral part including no object A is the peripheral part D2.

Subsequently, in Step S2 shown in FIG. 3, the image recognition processor 11 calculates the brightness of each of the object A (center part D1 of the captured image D) and the background B (peripheral part D2 of the captured image D). Specifically, the image recognition processor 11 totals the signal intensities of the pixels corresponding to the center part D1, of the output signal of the ISP 7, and calculates the average value of the signal intensities on the basis of the number of pixels. Similarly, the image recognition processor 11 totals the signal intensities of the pixels corresponding to the peripheral part D2, of the output signal of the ISP 7, and calculates the average value of the signal intensities on the basis of the number of pixels. The average values of the signal intensities represent the brightness of the center part D1 and the peripheral part D2. The brightness is represented by, for example, a numerical value of 0 to 1.0.

Subsequently, in Step S3, the image recognition processor of the controller 13 determines whether or not the difference in brightness between the center part D1 and the peripheral part D2 exceeds a predetermined threshold value (e.g., 0.2). This threshold value can be appropriately set. The image recognition processor 11 recognizes, in the case where it has been determined that the difference in brightness between the center part D1 and the peripheral part D2 exceeds the threshold value, that there is a distance difference, and recognizes, in the case where it has been determined that the difference in brightness between the center part D1 and the peripheral part D2 does not exceed the threshold value, that there is no distance difference. Since the object A and the background B are irradiated with flash light, it is possible to favorably recognize the distance difference between the object A (center part D1) and the background B (peripheral part D2) on the basis of the difference (contrast) in brightness or saturation between them.

In the case where the image recognition processor 11 of the controller 13 has recognized that there is no distance difference between the object A and the background B (No in Step S3), the controller 13 terminates the processing shown in FIG. 3 without adding the electronic watermark to the captured image D. That is, the controller 13 terminates the processing shown in FIG. 3 without storing the captured image D to which the electronic watermark has been added in the memory 8. Not storing the captured image D as described above is particularly effective in that the captured image D cannot be used in an electronic pawn shop, an Internet auction, a resale site, or the like. Even if the person who took the image tries to bid and apply, for example, the captured image D cannot be stored, and therefore, the bid, application, and the like using the captured image D cannot be executed. Thus, fraud can be prevented.

In the case where the image recognition processor 11 of the controller 13 has recognized that there is a distance difference between the object A and the background B (Yes in Step S3), the image recognition processor 11 outputs, to the authentication information adding processor 12, a detection signal indicating that there is a distance difference. Subsequently, in Step S4, upon receiving the detection signal, the authentication information adding processor 12 of the controller 13 adds the electronic watermark S to the captured image D.

The electronic watermark S and electronic signature are technologies for embedding information in image data so as not to be normally seen. By performing special processing thereon, it is possible to identify the owner of the image data.

The addition of the electronic watermark S to the captured image D is a proof that it has been determined that there is a distance difference between the object A and the background B in the captured image D. In the case where there is a distance difference between the object A and the background B, it can be determined that the captured image D is an image obtained by directly imaging the object A. The fact that "there is a distance difference between the object A and the background B" indicates that a genuine product has been imaged. In this regard, the image recognition processor 11 of the controller 13 adds the electronic watermark S to the captured image D in order to prove that the captured image D is an image obtained by directly imaging (photographing) the object A with the digital camera 1. Meanwhile, in the case where another person has reimaged the captured photograph with the digital camera 1, there is no difference in brightness or saturation between the object A and the background B in the image. In other words, the image recognition processor 11 proves that the captured image D is not an image obtained by reimaging, with the digital camera 1, the photograph captured by another person. That is, the image recognition processor 11 proves that the captured image D has not been fraudulently altered or forged. The authentication information adding processor 12 is capable of realizing prevention of fraud and tampering by adding the electronic watermark S to the captured image D.

In Step S5, the controller 13 stores the captured image D to which the electronic watermark S has been added in the memory 8.

The owner of the digital camera 1 provides the captured image D stored in the memory 8 to a digital pawn shop or the like, and applies for provision of various services. A service provider such as a digital pawn shop investigates and checks the captured image D provided from the owner of the digital camera 1 before providing the service. The service provider such as a digital pawn shop checks whether or not the electronic watermark S has been added to the captured image D. Note that whether or not there is the electronic watermark S can be easily checked using well-known software (application).

In the case where the electronic watermark S has been added to the captured image D, it has been proved that there is no fraud. For this reason, the service provider such as a digital pawn shop is capable of providing various services to the owner of the digital camera 1 (provider of the captured image D) with security. Meanwhile, in the case where the electronic watermark S has not been added to the captured image D, there is a possibility of fraud. For this reason, the service provider such as a digital pawn shop is capable of refusing to provide the service to the owner of the captured image D. Therefore, the service provider such as a digital pawn shop is capable of avoiding or preventing an unexpected loss.

As described above, in accordance with the digital imaging apparatus and the digital imaging method according to the embodiment, the electronic watermark S is added to the captured image D in the case where the object A is directly imaged by the digital camera 1, which proves that there is no fraud. That is, the digital camera 1 includes the camera module 2 that images the object A and the background B. Further, the controller 13 of the digital camera 1 includes the image recognition processor 11 that detects whether or not there is a distance difference between the object A and the background B in the captured image D that is captured by the camera module 2. Further, the controller 13 of the digital camera 1 includes the authentication information adding processor 12 that adds authentication information to the captured image D upon receiving, from the image recognition processor 11, the detection signal indicating that there is a distance difference. For this reason, the service provider such as a digital pawn shop is capable of providing various services to the owner of the digital camera 1 (provider of the captured image D) with security.

The camera module 2 includes the flash 5 (illumination unit) that illuminates the object A, and the image recognition processor 11 detects whether or not there is a distance difference between the object A and the background B on the basis of the brightness difference between the object A illuminated by the flash 5 and the background B illuminated by the flash 5. For this reason, it is possible to easily and reliably recognize whether or not there is a distance difference between the object A and the background B.

The digital camera 1 may include a plurality of camera modules 2, and the image recognition processor 11 may detect, on the basis of parallax generated by the plurality of camera modules 2, whether or not there is a distance difference between the object A and the background B. As a result, it can be determined that the captured image D is a directly captured image. That is, the image recognition processor 11 is capable of proving that a photograph captured by another person is not an image reimaged with the digital camera 1.

Although the case where a still image is captured with the digital camera 1 or the like has been described in the above-mentioned embodiment, the present disclosure is not limited to this embodiment. In an embodiment, a moving image may be captured with the digital camera 1, a smartphone, or the like. In such a case, electronic signature or the electronic watermark S may be added to the captured image D at all times or at regular time intervals.

Although an electronic watermark technology has been adopted in the above-mentioned embodiment, an electronic signature technology can be adopted. Although an electronic watermark technology has been adopted in the above-mentioned embodiment, a signal simply indicating that there is a "distance difference" may be added to the captured image D in the case where the digital imaging apparatus according to the embodiment has another authentication information adding technology. Although the case where electronic signature or the electronic watermark S is automatically added to the captured image D has been described in the above-mentioned embodiment, the present disclosure is not limited to this embodiment. In an embodiment, the person who took the image may be inquired about whether or not electronic signature or the electronic watermark S is to be added.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A digital imaging apparatus, comprising:
   a camera module that captures an image including an object and a background, and outputs data of a captured image;
   a memory that stores the output data of the captured image; and
   a controller that
      detects, on a basis of the output data of the captured image, whether or not there is a distance difference between the object and the background included in the captured image,
      determines whether the captured image is an image obtained by capturing a photograph of the object or an image obtained by directly capturing the object with the camera module, based on the result of the detection of the distance difference,
      upon determining that the captured image is an image obtained by directly capturing the object with the camera module, adds authentication information to the output data of the captured image, and stores, in the memory, the captured image to which the authentication information has been added, and
      upon determining that the captured image is an image obtained by capturing a photograph of the object, terminates the processing without adding the authentication information.

2. The digital imaging apparatus according to claim 1, wherein
   the camera module includes an illumination unit that illuminates the object, and
   the controller detects, on a basis of a brightness difference between the object illuminated by the illumination unit and the background illuminated by the illumination unit, the distance difference between the object and the background.

3. The digital imaging apparatus according to claim 2, wherein
   the controller
      determines whether or not the brightness difference exceeds a predetermined threshold value,
      detects, when it is determined that the brightness difference exceeds the threshold value, that there is the distance difference, and
      detects, when it is determined that the brightness difference does not exceed the predetermined threshold value, that there is no distance difference.

4. The digital imaging apparatus according to claim 1, wherein
   the camera module includes a plurality of camera modules, and
   the controller detects, on a basis of parallax generated by the plurality of camera modules, the distance difference between the object and the background.

5. The digital imaging apparatus according to claim 1, wherein
   the authentication information is one of electronic signature and electronic watermark.

6. A digital imaging method, comprising:
   capturing, by a camera module, an image including an object and a background;

detecting, on a basis of data of the captured image, whether or not there is a distance difference between the object and the background included in the captured image;

determining whether the captured image is an image obtained by capturing a photograph of the object or an image obtained by directly capturing the object with the camera module, based on the result of the detection of the distance difference;

upon determining that the captured image is an image obtained by directly capturing the object with the camera module, adding authentication information to the data of the captured image, and storing, in a memory, the captured image to which the authentication information has been added; and upon determining that the captured image is an image obtained by capturing a photograph of the object, terminating the processing without adding the authentication information.

7. The digital imaging method according to claim 6, wherein the step of detecting whether or not there is a distance difference includes detecting, on a basis of a brightness difference between the object illuminated by an illumination unit of the camera module and the background illuminated by the illumination unit, the distance difference between the object and the background.

8. The digital imaging method according to claim 7, wherein the step of detecting whether or not there is a distance difference includes determining whether or not the brightness difference exceeds a predetermined threshold value, detecting, when it is determined that the brightness difference exceeds the threshold value, that there is the distance difference, and detecting, when it is determined that the brightness difference does not exceed the predetermined threshold value, that there is no distance difference.

9. The digital imaging method according to claim 6, wherein the step of detecting whether or not there is a distance difference includes detecting, on a basis of parallax generated by a plurality of camera modules, the distance difference between the object and the background.

10. The digital imaging method according to claim 6, wherein the authentication information is one of electronic signature and electronic watermark.

* * * * *